US011814499B2

(12) United States Patent
Traßl et al.

(10) Patent No.: US 11,814,499 B2
(45) Date of Patent: Nov. 14, 2023

(54) PEI PARTICLE FOAMS FOR APPLICATIONS IN AIRCRAFT INTERIORS

(71) Applicant: Evonik Operations GmbH, Essen (DE)

(72) Inventors: Christian Traßl, Warmensteinach (DE); Denis Holleyn, Hofheim am Taunus (DE); Kay Bernhard, Cheshire, CT (US)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 18/063,075

(22) Filed: Dec. 7, 2022

(65) Prior Publication Data

US 2023/0105032 A1 Apr. 6, 2023

Related U.S. Application Data

(62) Division of application No. 16/640,626, filed as application No. PCT/EP2018/072392 on Aug. 20, 2018, now abandoned.

(30) Foreign Application Priority Data

Aug. 24, 2017 (EP) ..................... 17187663

(51) Int. Cl.
| | | |
|---|---|---|
| C08J 9/18 | (2006.01) | |
| C08J 9/228 | (2006.01) | |
| B29B 9/06 | (2006.01) | |
| B29C 44/34 | (2006.01) | |
| B29K 79/00 | (2006.01) | |
| B29K 105/04 | (2006.01) | |

(52) U.S. Cl.
CPC ............... C08J 9/18 (2013.01); B29B 9/06 (2013.01); B29C 44/3461 (2013.01); C08J 9/228 (2013.01); *B29K 2079/085* (2013.01); *B29K 2105/04* (2013.01); *C08J 2201/03* (2013.01); *C08J 2205/04* (2013.01); *C08J 2207/00* (2013.01); *C08J 2379/08* (2013.01)

(58) Field of Classification Search
CPC . C08J 9/18; C08J 9/228; C08J 2201/03; C08J 2205/04; C08J 2207/00; C08J 2379/08; C08J 2205/10; C08J 9/232; C08J 9/16; C08J 9/04; C08J 9/236; B29B 9/06; B29B 9/065; B29B 9/12; B29B 9/10; B29B 9/16; B29B 2009/166; B29C 44/3461; B29C 44/02; B29K 2079/085; B29K 2105/04; B32B 2262/02; B32B 5/20; B32B 7/09; B32B 7/12; B32B 15/046; B32B 2250/02; B32B 2266/0214; B32B 2266/06; B32B 2266/08; B32B 2307/4026; B32B 2307/54; B32B 21/047; B32B 2266/10; B32B 2307/3065; B32B 2307/50; B32B 2307/542; B32B 2307/71; B32B 2307/72; B32B 2307/7265; B32B 2605/18

See application file for complete search history.

(56) References Cited

U.S. PATENT DOCUMENTS

| | | | |
|---|---|---|---|
| 4,532,263 | A | 7/1985 | Krutchen et al. |
| 5,091,126 | A | 2/1992 | Weber et al. |
| 8,535,585 | B2 | 9/2013 | Casalini et al. |
| 9,782,944 | B2 | 10/2017 | Martin et al. |
| 10,556,357 | B2 | 2/2020 | Richter et al. |
| 10,919,198 | B2 | 2/2021 | Kraatz et al. |
| 11,485,832 | B2 | 11/2022 | Traßl et al. |
| 2001/0031794 | A1 | 10/2001 | Yamamoto et al. |
| 2007/0149629 | A1 | 6/2007 | Donovan et al. |
| 2009/0163610 | A1 | 6/2009 | Lanning et al. |
| 2011/0065819 | A1 | 3/2011 | Schips et al. |
| 2011/0284689 | A1 | 11/2011 | Thomas et al. |
| 2016/0332344 | A1* | 11/2016 | Bernhard ............... B29B 9/12 |
| 2018/0186958 | A1 | 7/2018 | Yamamoto et al. |
| 2018/0215063 | A1 | 8/2018 | Richter et al. |
| 2018/0311869 | A1 | 11/2018 | Kraatz et al. |
| 2020/0207939 | A1 | 7/2020 | Traßl et al. |
| 2020/0325298 | A1 | 10/2020 | Traßl et al. |
| 2020/0407558 | A1 | 12/2020 | Traßl et al. |
| 2021/0095092 | A1 | 4/2021 | Traßl et al. |
| 2022/0063153 | A1 | 3/2022 | Richter et al. |
| 2022/0126490 | A1 | 4/2022 | Richter et al. |

FOREIGN PATENT DOCUMENTS

| | | |
|---|---|---|
| CN | 101374908 | 2/2009 |
| CN | 102256870 | 11/2011 |

(Continued)

OTHER PUBLICATIONS

U.S. Appl. No. 10,556,357, filed Feb. 11, 2020, 2018/0215063, Richter et al.

(Continued)

*Primary Examiner* — K. Boyle
(74) *Attorney, Agent, or Firm* — Grüneberg and Myers PLLC

(57) ABSTRACT

Polymer foams based on polyetherimides (PEIs) fulfill the legal specifications demanded by the aviation industry for aircraft interiors. Specifically, the demands on fire characteristics, stability to media and mechanical properties constitute a great challenge here. According to related art, suitable polymer foams are produced as semi-finished products. Reprocessing to give shaped articles is uneconomic in terms of time and material exploitation, for example by virtue of large amounts of cutting waste. The material is suitable in principle and can be processed to give particle foam mouldings. These mouldings can be produced without reprocessing in short cycle times and, hence, economically. Furthermore, this gives rise to new means of functional integration, for example by direct incorporation of inserts etc. in the foam, and with regard to freedom in terms of design.

15 Claims, No Drawings

(56) References Cited

FOREIGN PATENT DOCUMENTS

| CN | 102555329 | 7/2012 |
|---|---|---|
| EP | 0 411 437 | 2/1991 |
| EP | 3 202 837 | 8/2017 |
| EP | 3 225 654 | 10/2017 |
| JP | S5936139 | 2/1984 |
| RU | 2518862 | 6/2014 |
| WO | 2019/101703 | 5/2019 |
| WO | 2022/037857 | 2/2022 |
| WO | 2022/117331 | 6/2022 |

OTHER PUBLICATIONS

U.S. Appl. No. 10,919,198, filed Feb. 16, 2021, 2018/0311869, Kraatz et al.
U.S. Appl. No. 18/003,666, filed Dec. 28, 2022, Traßl et al.
U.S. Appl. No. 16/640,626, filed Feb. 20, 2020, 2020/0207939, Traßl et al.
U.S. Appl. No. 17/995,030, filed Sep. 29, 2022, Wursche et al.
U.S. Appl. No. 11,485,832, filed Nov. 1, 2022, 2020/0325298, Traßl et al.
U.S. Appl. No. 16/767,240, filed May 27, 2020, 2020/0407558, Traßl et al.
U.S. Appl. No. 15/733,134, filed May 26, 2020, 2021/0095092, Traßl et al.
U.S. Appl. No. 17/423,152, filed Jul. 15, 2021, 2022/0126490, Richter et al.
U.S. Appl. No. 17/310,059, filed Jul. 14, 2021, 2022/0063153, Richter et al.
Berlin et al. "Uprocnennye gazanapolnennye plastmassy" [Reinforced gas-filled plastics], Moscow "Himia", 1980, p. 197.
International Search Report issued in PCT Application No. PCT/EP2018/072392, dated Sep. 14, 2018, 5 pages.
Russian Office Action dated Feb. 7, 2022, in Russian Application No. 2020111351, 12 pages.
Written Opinion issued in PCT Application No. PCT/EP2018/072392, dated Sep. 14, 2018, 12 pages.
Goldmann et al., U.S. Appl. No. 18/250,824, filed Apr. 27, 2023.
U.S. Appl. No. 18/250,824, filed Apr. 27, 2023, Goldmann et al.
Traßl et al., U.S. Appl. No. 18/255,409, filed Jun. 1, 2023.
U.S. Appl. No. 18/255,409, filed Jun. 1, 2023, Traßl et al.

* cited by examiner

PEI PARTICLE FOAMS FOR APPLICATIONS IN AIRCRAFT INTERIORS

CROSS-REFERENCE TO RELATED APPLICATIONS

This application is a divisional application of U.S. application Ser. No. 16/640,626, filed on Feb. 20, 2020, which was the National Stage entry under § 371 of International Application No. PCT/EP2018/072392, filed on Aug. 20, 2018, and which claims the benefit of priority to European Application No. 17187663.4, filed on Aug. 24, 2017. The content of each of these applications is hereby incorporated by reference in its entirely,

BACKGROUND OF THE INVENTION

Field of the Invention

Polymer foams based on polyetherimides (PEIs) fulfil the legal specifications demanded by the aviation industry for aircraft interiors. Specifically the demands on fire characteristics, stability to media and mechanical properties constitute a great challenge here. According to the prior art, suitable polymer foams are produced as semifinished products. Reprocessing to give shaped articles is uneconomic in terms of time and material exploitation, for example by virtue of large amounts of cutting waste. The invention solves this problem in that the material which is suitable in principle can be processed to give particle foam mouldings. These mouldings can be produced without reprocessing in short cycle times and hence economically. Furthermore, this gives rise to new means of functional integration, for example by direct incorporation of inserts etc. in the foam, and with regard to freedom in terms of design.

Description of Related Art

Foam materials suitable for installation in the aviation industry are common knowledge. However, the majority of the foams described for this purpose are composed of pure PMI (polymethacrylimide), PPSU (polyphenylene sulfones) or PES (polyether sulfones) only. Also to be found in the literature is PI (polyarylimide), although it is unsuitable from a toxicological point of view. All these materials have been used to date exclusively as block or slab materials.

Other materials have also been described in less detail as slab material for installation in the aviation industry. Poly(oxy-1,4-phenylsulfonyl-1,4-phenyl) (PESU) is an example of such a material. This is sold, for example, under the Divinycell F product name by DIAB. In the further processing of these extruded foam boards, however, uneconomically large amounts of offcut material arise.

An economic method for avoidance of cutting waste in the production of three-dimensional foam mouldings is the use of foam particles (bead foams) rather than slabstock foams. All the particle foams available according to the prior art have either drawbacks in the case of use at high temperatures or else non-optimal mechanical properties overall, and especially at these high temperatures. Furthermore, only very few existing foams are not extremely flammable and so qualify for installation in the interiors of road, rail or air vehicles for example. For example, particle foams based on polypropylene (EPP), polystyrene (EPS), thermoplastic polyurethane elastomer (E-TPU) or PMI (ROHACELL Triple F) have inadequate flame retardancy, while all inherently flame-retardant polymers that are suitable in principle, for example PES, PEI or PPSU, are processed solely to give slabstock foams according to the current prior art.

SUMMARY OF THE INVENTION

PROBLEM

The problem addressed by the present invention, with regard to the prior art, was that of providing a composition for production of novel foams or composite materials, which may comprise, for example, a foam core with thermoplastic or crosslinked outer layers, for use in aircraft construction. The resulting foams are to have a good combination of usability at high temperatures, good mechanical properties, especially with regard to sufficient elongation at break, and at least sufficient flame retardancy for many applications in the field of vehicle and aircraft construction.

More particularly, the foam is to have high stability with respect to various liquid, acidic, basic or hydrophobic liquids, and with respect to emulsions.

Furthermore, the foam is to be realizable from the composition to be developed by a wide variety of different methods and with a wide range of three-dimensional shapes, and only very little offcut material, if any at all, is to arise in the production of the final component.

Further non-explicit problems may be apparent from the description or the examples in the present text, without having been explicitly recited here for this purpose.

SOLUTION

The problems are solved by the provision of a novel composition for production of thermally stable foam materials of low flammability for use in the aviation industry, especially in aircraft construction. This inventive composition for production of foams is characterized in that it comprises a particle foam based on polyetherimides (PEI). The particle foam according to the invention, as a foamed material, has a glass transition temperature between 180 and 215° C., and the mean cell diameter of the particle foam therein is less than 2 mm, preferably less than 1 mm, more preferably less than 500 µm and most preferably less than 250 µm.

This is especially surprising since the actual glass transition temperature of the PEI is 215 to 217° C., and the material thus cannot be processed to give a particle foam according to the current prior art, for example by means of underwater pelletization.

DETAILED DESCRIPTION OF THE INVENTION

According to the invention, the term "cell" describes a region in a foam that does not contain any matrix material but is at least partly surrounded thereby. Cells are also referred to here as pores. Ideally, in a rigid foam, these pores or cells are closed, which in turn means that the cell is completely surrounded by the matrix material of the foam. In the case of a softer foam, open cells are present at least to some degree. These can nevertheless be identified as individual cells through the arrangement of incomplete walls or in the extreme case of bars. It is thus also possible to determine the size of such open cells. The size of a cell can in many cases be measured in a simple manner, for example with the aid of a microscope. Taking account of these factors as well, it is possible for the person skilled in the art to comply with the maximum cell size ill the foam.

A foam particle is understood in accordance with the invention to mean the region in a particle foam defined by foaming of an individual unfoamed or prefoamed particle. The boundary between the individual foam particles bonded to one another can easily be seen by the naked eye or determined under a light microscope. This is applicable especially when the boundaries between two foam particles are readily apparent. Since this need not necessarily be the case, however, the invention employs a simplified method: for this purpose, a theoretical average diameter of a foam particle is calculated in a simple manner from the diameter of the unfoamed particles, the total volume of the unfoamed particles and the volume of the finished foam part. The person skilled in the art is aware that, in the case of particle foams, a regular size distribution of the foam particles can be achieved in such a way that small deviations occur only in the edge regions of the foam part. It is a further advantage of the present invention that the proportion by volume of the gaps between the individual foam particles is so small that it is barely manifested in the measurement of volume of the finished foam part. Preferably, these foam particles in the finished foam are smaller than 1 cm, more preferably smaller than 0.7 cm.

According to the invention glass transition temperatures reported are measured by means of DSC (differential scanning calorimetry) unless otherwise stated. In this regard, those skilled in the art are aware that DSC is only sufficiently conclusive when, after a first heating cycle up to a temperature which is a minimum of 25° C. above the highest glass transition or melting temperature but at least 20° C. below the lowermost breakdown temperature of a material, the material sample is kept at this temperature for at least 2 min. Thereafter, the sample is cooled back down to a temperature at least 20° C. below the lowermost glass transition or melting temperature to be determined, where the cooling rate should be not more than 20° C./min, preferably not more than 10° C./min. After a further wait time of a few minutes, the actual measurement is effected, in which the sample is heated at a heating rate of generally 10° C./min or less up to at least 20° C. above the highest melting or glass transition temperature.

Preferably, the inventive composition for production of the particle foam, in a first alternative embodiment of the invention, consists of 80% to 99.5% by weight of PEI. In addition, this composition includes 0.5% to 10% by weight, preferably 1% to 9% by weight, of a blowing agent. It may further contain inter alia 0% to 10% by weight, preferably 1% to 5% by weight, of additives.

The additives may especially be flame retardants, plasticizers, pigments, UV stabilizers, nucleating agents, impact modifiers, adhesion promoters, rheology modifiers, chain extenders, fibres and/or nanoparticles.

The flame retardants used are generally phosphorus compounds, in particular phosphates, phosphines or phosphites. Suitable UV stabilizers and/or UV absorbers are common general knowledge in the art. HALS compounds. Tinuvins or triazoles are generally used for this purpose. The impact modifiers used are generally polymer beads comprising an elastomeric and/or soft/flexible phase. These polymer beads frequently comprise core-(shell-)shell beads having an outer shell which, as such, is no more than lightly crosslinked and as purely polymer would exhibit at least minimal miscibility with the PEI. Any known pigments are employable in principle. Major amounts in particular do of course require testing as to their influence on the foaming operation, like all other additives employed in amounts above 0.1 wt %. This is not very burdensome to do for a person skilled in the art.

Suitable plasticizers, rheology modifiers and chain extenders are common general knowledge in the art of producing sheetings, membranes or mouldings from PEI or blends comprising PEI, and are accordingly transferrable at minimal cost and inconvenience to the production of a foam from the composition according to the present invention.

The optionally added fibres are generally known fibrous materials for addition to a polymer composition. In a particularly suitable embodiment of the present invention, the fibres are PEI fibres, PES fibres, PPSU fibres or blend fibres, the latter from a selection of the polymers mentioned.

Nanoparticles, for example in the form of tubes, platelets, rods, spheres or in other known forms, are inorganic materials in general. They may perform various functions in the final foam at one and the same time. This is because these particles act in part as nucleating agents in the foaming operation. The particles can further influence the mechanical properties as well as the (gas) diffusion properties of the foam. The particles further make an additional contribution to low flammability.

The recited nanoparticles aside, microparticles or largely immiscible, phase-separating polymers may also be included as nucleating agents. In the context of nucleating agents in the composition, the polymers described must be viewed separately from the other nucleating agents, since the latter primarily exert influence on the mechanical properties of the foam, on the melt viscosity of the composition and hence on the foaming conditions. The additional effect of a phase-separating polymer as a nucleating agent is an additional desired effect of this component, but not the primary effect in this case. Therefore, these additional polymers appear further up in the overall tally, separate from the other additives.

It is optionally also possible for the additives to include up to 9% by weight of a further polymer component for adjustment of the physical properties. The additional polymers may, for example, be polyamides, polyolefins, in particular PP, polyesters, in particular PET, sulfur-based polymers, for example PSU, PPSU, PES or poly(meth)acrylimide.

The choice of blowing agent is relatively free and for a person skilled in the art is dictated in particular by the foaming method chosen, its solubility in the polymer and the foaming temperature. Suitable examples are alcohols, e.g. isopropanol or butanol-ketones, such as acetone or methyl ethyl ketone, alkanes, such as isobutane, n-butane, isopentane, n-pentane, hexane, heptane or octane, alkenes, e.g. pentane, hexene, heptene or octane, $CO_2$, $N_2$, water, ethers, e.g. diethyl ether, aldehydes, e.g. formaldehyde or propanal, hydro(chloro)fluorocarbons, chemical blowing agents or mixtures of two or more thereof.

Chemical blowing agents are relatively or completely non-volatile substances which undergo chemical decomposition under foaming conditions to form the actual blowing agent upon decomposition. tert-Butanol is a very simple example thereof in that it forms isobutane and water under foaming conditions. Further examples are $NaHCO_3$, citric acid, citric acid derivatives, azoclicarbonamide (ADC) and/or compounds based thereon, toluenesulfonylhydrazine (TSH), oxybis(benzosulfohydroazide) (OBSH) or 5-phenyltetrazole (5-PT).

Preferably, the particle foam according to the invention has a tensile strength to ISO1926 of greater than 0.5 MPa, an elongation at break to ISO1926 of between 8% and 12%, a shear modulus to ASTM 0273 at room temperature of greater than 8 MPa, a shear resistance to ASTM 0273 at room temperature of greater than 0.45 MPa, a compressive modulus to ISO 844 at room temperature of greater than 13 MPa, and a compressive strength to ISO 844 at room temperature of greater than 0.4 MPa. In the case of employment of the process described further down for production of the particle foam, it is a simple matter for the person skilled in the art to comply with these mechanical properties while maintaining the glass transition temperature and cell size according to the invention. In addition, it has also been found that, surprisingly, the particle foam according to the invention is usable with satisfaction of the fire protection specifications or fire properties according to FAR 25.852 that are of particular importance for use in the interior of an aircraft in the aviation industry.

It is also very surprising that all the material properties required that are a prerequisite for use in an aircraft interior are fulfilled by a particle foam according to the invention, just as they are by a corresponding foam in slab form. For PMI, for example, this relationship does not exist, since the conditions are fulfilled for this polymethacrylimide sheet material composed of a slabstock foam, whereas a particle foam often has poorer mechanical properties than a slabstock foam. A particularly surprising advantage that has additionally been found is that a particle foam of this kind, by contrast with a slabstock foam, has no significant cell orientation, if any at all. This dives rise to advantageous isotropic mechanical properties for a particle foam ill many cases, whereas a corresponding slabstock foam often has anisotropic mechanical properties in that they differ in one area and ill an axis at right angles to this area. According to specific use, isotropic mechanical properties may quite possibly be advantageous, especially when there are uniform compressive stresses from different directions.

Preferably, the foams according to the invention have a degree of foaming that amounts to a reduction in the density with respect to the unfoamed material of between 1% and 98%, preferably between 50% and 97%, more preferably between 70% to 95%. The foam preferably has a density between 20 and 1000 kg/m$^3$, preferably 40 and 250 kg/m$^3$, especially preferably between 50 and 150 kg/m$^3$.

As well as the particle foam according to the invention, processes for production thereof are also part of the present invention.

In principle, there are two preferred methods for production of the PEI particle foams according to the invention. In a first process variant, a composition consisting of 80% to 99.5% by weight of PEI, 0.5% to 10% by weight of blowing agent and 0% to 10% by weight of additives is processed by means of an extruder having a perforated plate to dive foamed or foamable pellets. The temperatures between intake zone and screw tip are preferably within a range between 320 and 400° C. Furthermore, there is usually no homogeneous temperature over this distance, but instead, for example, a gradient with rising temperature in conveying direction of the polymer melt. The temperature of the perforated plate is between 250 and 350° C., and the melt temperature on exit through the perforated plate is between 230 and 360° C. The loading with the blowing agent is generally effected in the extruder. The pellets then foam as they exit from the perforated plate when the pressure in the underwater pelletization is lower than the expansion force of the blowing agent. The pellets thus foamed are then preferably processed further to give a particle foam.

In one variant of this embodiment, the composition on exit from the extruder can be guided into an underwater pelletizer. This underwater pelletizer is designed to have a combination of temperature and pressure such that foaming is prevented. This procedure provides a pellet material laden with blowing went, which may later be expanded to the desired density by a renewed supply of energy and/or further processed into a bead foam workpiece by optional moulding. The energy input necessary for pre-foaming can be effected by means of contact heating, for example in an air circulation oven, or in a radiation-based manner by means of IR or microwave radiation.

In a second process variant for production of a PEI particle foam, a composition consisting of 90% to 100% by weight of PEI and 0% to 10% by weight of additives is processed by means of an extruder with a perforated plate likewise at first to give pellets, but is not laden with a blowing agent. Here too, the temperatures—which are again not necessarily uniform—between intake zone and screw tip are within a range between 320 and 400° C. The temperature of the perforated plate is likewise between 250 and 350° C., and the melt temperature on exit through the perforated plate is between 230 and 360° C. Here, the pellets are subsequently laden with a blowing agent in an autoclave in such a way that they contain between 0.5% and 10% by weight of blowing agent. The blowing agent-laden pellets can then be foamed by expansion and/or by heating to a temperature exceeding 200° C. to obtain a particle foam.

In relation to the actual foaming, various methods of foaming polymeric compositions are known in principle by a person skilled in the art to be in principle applicable to the present composition particularly in respect of methods for thermoplastic foams. For example, the composition can be foamed at a temperature between 150 and 250° C. and at a pressure between 0.1 and 2 bar. Preferably, the actual foaming, if it does not follow after the extrusion, is effected at a temperature between 180 and 230° C. in a standard pressure atmosphere.

In the variant of the later loading with a blowing agent, a composition still without blowing agent is admixed with the blowing agent in an autoclave at a temperature, for example, between 20 and 120° C. and at a pressure, for example, between 30 and 100 bar and subsequently expanded inside the autoclave by reducing the pressure and raising the temperature to the foaming temperature.

Alternatively, the composition admixed with the blowing agent is cooled down in the autoclave and deautoclaved after cooling. This composition is then expandable at a later date by heating to the foaming temperature. This may also take place, for example, under further moulding or in combination with other elements such as inserts or facing layers.

More preferably, the particle foam produced—irrespective of the process used—is subsequently adhesive-bonded, sewn or welded to a cover material. "Welded" means here that heating of the components gives rise to cohesion or adhesion between the materials, for example through partial filling of open pores at the foam surface with cover material.

The cover material may comprise wood. metals, decorative films, composite materials, prepregs or other known materials.

In the case of later foaming of the material used, for example after the loading with blowing agent in an autoclave, the particle foam produced can alternatively also be foamed in the presence of a cover material such that it is bonded thereto by means of adhesive bonding or welding.

In the process variant in which the loading with blowing agent is effected in an extruder. the PEI can alternatively also be applied on exit from the extruder into an optionally heated mould, optionally containing cover materials. In this case, foaming is effected with shaping to give a particle foam or a composite material. Alternatively, the composition, on exit from the extruder, can be guided into a foam spraying apparatus. In this apparatus, expansion then takes place directly with moulding.

Irrespective of the variants used, the particle foams or composite materials can be provided with inserts during the foaming and/or channels can be incorporated into the particle foam.

Foams according to the invention, or the foams produced by the process according to the invention, find use in the construction of spacecraft or aircraft, especially in the interior or exterior thereof. This may include the particle foams, whether produced by the process according to the invention or not, and likewise the composite materials realized therefrom. More particularly, by virtue of their low flammability, the foams of the present invention can also be installed in the interior of these vehicles.

More particularly, the pure PEI particle foams are especially suitable for incorporation within the interior of an aircraft. Aircraft especially include, as well as jets or small aircraft, helicopters or even spacecraft. Examples of installation in the interior of such an aircraft are, for example, the tablets that can be folded down on the reverse side of a seat in a passenger aircraft, the filling of a seat, or an internal partition, and also, for example, in internal doors.

Particle foams based on a blend containing PEI are additionally also suitable for incorporation in the exterior of an aircraft as well, The "exterior" means not just as a filling in the outer skin of an aircraft, but especially also in an aircraft nose, in the tail region, in the wings, in the outside doors, in the control surfaces or in rotor blades.

The invention claimed is:

1. A process, comprising:
    extruding a melted composition to form a pellet material, wherein the melted composition consists of 80% to 99.5% by weight of polyetherimide (PEI), 1 to 9% by weight of blowing agent, and 1% to 5% by weight of additives, wherein the amounts of the PEI, blowing and agent additives adds up to 100% by weight; wherein the extruder comprises a perforated plate,
    wherein the temperatures between an intake zone and a screw tip of the extruder are within a range of 180° C. and 380° C., wherein a temperature of the perforated plate is between 250° C. and 350° C., and wherein a melt temperature of the melted composition on exit through the perforated plate is between 230° C. and 360° C.,
    pre-foaming the pellet material with an energy of infrared radiation to give pre-foamed pellet material, and
    foaming the pre-foamed pellet material to form a PEI particle foam,
        wherein the PEI particle foam has a glass transition temperature between 180° C. and 215° C., and wherein a mean cell diameter of the PEI particle foam is less than 2 mm.

2. The process according to claim 1, further comprising, after forming the PEI particle foam, bonding, sewing, or welding the PEI particle foam to cover materials.

3. The process according to claim 1, wherein during foaming to form the PEI particle foam, the pre-foamed pellet material is adhesive-bonded or welded to a cover material.

4. The process according to claim 1, further comprising:
    introducing the composition on exit from the extruder into an optionally heated mould, optionally containing cover materials, and
    foaming with shaping to give the PEI particle foam or a composite material of the PEI particle foam plus the cover material.

5. The process according to claim 1, wherein inserts and/or channels are incorporated into the PEI particle foam during the foaming.

6. The process according to claim 1, further comprising: incorporating the PEI particle foam in an aircraft.

7. : The process according to claim 6, wherein the aircraft is selected from the group consisting of a jet, a small aircraft, a helicopter, and a spacecraft.

8. The process according to claim 6, wherein the PEI particle foam is incorporated in the interior of the aircraft.

9. The process according to claim 6, wherein the PEI particle foam is incorporated in the exterior of the aircraft.

10. The process according to claim 1, wherein the additives are at least one selected from the group consisting of flame retardants, plasticizers, pigments, UV stabilizers, nucleating agents, impact modifiers, adhesion promoters, rheology modifiers, chain extenders, fibres, nanoparticles, and an additional polymer component.

11. The process according to claim 10, wherein the additional polymer component is at least one selected from the group consisting of polyamides, polyolefins, polyesters, sulfur-based polymers, and poly(meth)acrylimide.

12. The process according to claim 1, wherein the blowing agent is selected from the group consisting of an alcohol, a ketone, an alkane, an alkene, $CO_2$, $N_2$, water, an ether, an aldehyde, chemical blowing agents, and mixtures of two or more thereof.

13. The process according to claim 1, wherein the PEI particle foam has a tensile strength according to ISO1926 of greater than 0.5 MPa, an elongation at break according to ISO1926 of between 8% and 12%, a shear modulus according to ASTM C273 at room temperature of greater than 8 MPa, a shear resistance according to ASTM C273 at room temperature of greater than 0.45 MPa, a compressive modulus according to ISO 844 at room temperature of greater than 13 MPa, and a compressive strength according to ISO 844 at room temperature of greater than 0.4 MPa.

14. The process according to claim 1, wherein the mean cell diameter of the PEI particle foam is less than 500 μm.

15. The process according to claim 1, wherein the pellet material is laden with the blowing agent at the pre-foaming.

* * * * *